(12) United States Patent
Zevallos

(10) Patent No.: US 10,965,820 B2
(45) Date of Patent: Mar. 30, 2021

(54) APPARATUS AND METHOD FOR THE GENERATION OF CHARGING INFORMATION

(71) Applicant: Nokia Solutions and Networks Oy, Espoo (FI)

(72) Inventor: Cesar Augusto Zevallos, Helsinki (FI)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 16/611,594

(22) PCT Filed: May 8, 2017

(86) PCT No.: PCT/EP2017/060915
§ 371 (c)(1),
(2) Date: Nov. 7, 2019

(87) PCT Pub. No.: WO2018/206075
PCT Pub. Date: Nov. 15, 2018

(65) Prior Publication Data
US 2020/0162619 A1 May 21, 2020

(51) Int. Cl.
*H04W 4/24* (2018.01)
*H04M 15/00* (2006.01)

(52) U.S. Cl.
CPC ........... *H04M 15/60* (2013.01); *H04M 15/41* (2013.01); *H04M 15/64* (2013.01); *H04M 15/65* (2013.01); *H04M 15/8228* (2013.01); *H04W 4/24* (2013.01)

(58) Field of Classification Search
CPC ...... H04M 15/60; H04M 15/41; H04M 15/64; H04M 15/65; H04M 15/8228;
(Continued)

(56) References Cited

U.S. PATENT DOCUMENTS 9,900,444 B1 * 2/2018 Seetharaman .... H04M 15/8228
2013/0208629 A1 * 8/2013 Luo ..................... H04L 65/1006
370/259
(Continued)

OTHER PUBLICATIONS

International Search Report and Written Opinion received for corresponding Patent Cooperation Treaty Application No. PCT/EP2017/060915, dated Jan. 25, 2018, 14 pages.
(Continued)

*Primary Examiner* — Julio R Perez
(74) *Attorney, Agent, or Firm* — Nokia Technologies Oy

(57) ABSTRACT

The proposed solution relates to a method and an apparatus in a communication system. The solution comprises creating (400) a bearer for user terminal communication; transmitting (402) a credit control request message to Online Charging System, storing (404) the message to a transmission buffer, receiving (406) a credit control answer message as a reply to the request message and, if the credit control answer message comprises an error code: opening (412) a charging data record and timestamping the opening with the time the bearer was created, copying (414) the message from the transmission buffer to the charging data record, adding (416) information regarding rating groups affected by the error to the charging data record as containers and closing the containers and updating (418) result code-field of the charging data record according to the error code.

18 Claims, 6 Drawing Sheets

(58) Field of Classification Search
CPC .... H04M 15/70; H04M 15/725; H04M 15/73; H04M 15/74; H04W 4/24; H04L 12/1403; H04L 12/1407; H04L 12/14
See application file for complete search history.

(56) References Cited

U.S. PATENT DOCUMENTS

2014/0273932 A1   9/2014  Sharma et al.
2014/0307537 A1  10/2014  Baer et al.
2017/0374203 A1* 12/2017  Sharma ................. H04M 15/41

OTHER PUBLICATIONS

"3rd Generation Partnership Project; Technical Specification Group Services and System Aspects; Telecommunication management; Charging management; Packet Switched (PS) domain charging (Release 10)", 3GPP TS 32.251, V10.5.0, May 2011, pp. 1-82.
"3rd Generation Partnership Project; Technical Specification Group Services and System Aspects; Telecommunication management; Charging management; Diameter chagin applications (Release 11)", 3GPP TS 32.299, V11.1.0, Sep. 2011, pp. 1-149.

* cited by examiner

APPARATUS AND METHOD FOR THE GENERATION OF CHARGING INFORMATION

RELATED APPLICATION

This application was originally filed as Patent Cooperation Treaty Application No. PCT/EP2017/060915 filed May 8, 2017.

TECHNICAL FIELD

The exemplary and non-limiting embodiments of the invention relate generally to communications.

BACKGROUND

Modern telecommunication systems such as universal mobile telecommunications system (UMTS) radio access network (UTRAN or E-UTRAN), long term evolution (LTE, known also as E-UTRA), long term evolution advanced (LTE-A), comprise a charging architecture which is used for charging of different services. The architecture comprises two different kinds of mechanisms, offline charging and online charging. Offline charging utilises Charging Collection Function (CCF) and online charging utilises an Online Charging System (OCS). The mechanism used may depend on the service. Offline changing and online charging typically operate independently. However, there has been developed some interworking mechanisms between different changing methods, namely tight interworking online offline charging and independent interworking online offline charging. The latter is mandatory for operators of communication systems to support while the first is optional.

In normal operation situations, the above solutions work well. However, if there is an error in charging, the present solutions may disclose problems due to which some information regarding charging may be lost.

BRIEF DESCRIPTION

According to an aspect of the present invention, there is provided an apparatus in a communication system, comprising: at least one processor and at least one memory including a computer program code, wherein the at least one memory and the computer program code are configured, with the at least one processor, to cause the apparatus to perform operations comprising: creating a bearer for user terminal communication; transmitting a credit control request message to Online Charging System; storing the message to a transmission buffer; receiving a credit control answer message as a reply to the request message and, if the credit control answer message comprises an error code: opening a charging data record and timestamping the opening with the time the bearer was created; copying the message from the transmission buffer to the charging data record; adding information regarding rating groups affected by the error to the charging data record as containers and closing the containers; updating result code-field of the charging data record according to the error code.

According to an aspect of the present invention, there is provided a method in an apparatus of a communication system, comprising: creating a bearer for user terminal communication; transmitting a credit control request message to Online Charging System; storing the message to a transmission buffer; receiving a credit control answer message as a reply to the request message and, if the credit control answer message comprises an error code: opening a charging data record and timestamping the opening with the time the bearer was created; copying the message from the transmission buffer to the charging data record; adding information regarding rating groups affected by the error to the charging data record as containers and closing the containers; updating result code-field of the charging data record according to the error code.

One or more examples of implementations are set forth in more detail in the accompanying drawings and the description below. Other features will be apparent from the description and drawings, and from the claims.

BRIEF DESCRIPTION OF THE DRAWINGS

In the following the invention will be described in greater detail by means of preferred embodiments with reference to the attached [accompanying] drawings, in which.

DETAILED DESCRIPTION OF SOME EMBODIMENTS

Embodiments are applicable to any base station, user equipment (UE), user terminal (UT), corresponding component, and/or to any communication system or any combination of different communication systems that support required functionalities.

The protocols used, the specifications of communication systems, servers and user terminals, especially in wireless communication, develop rapidly. Such development may require extra changes to an embodiment. Therefore, all words and expressions should be interpreted broadly and they are intended to illustrate, not to restrict, embodiments.

Many different radio protocols to be used in communications systems exist. Some examples of different communication systems are the universal mobile telecommunications system (UMTS) radio access network (UTRAN or E-UTRAN), long term evolution (LTE, known also as E-UTRA), long term evolution advanced (LTE-A), 5th generation mobile networks, Wireless Local Area Network (WLAN) based on IEEE 802.11 stardard, worldwide interoperability for microwave access (WiMAX), Bluetooth®, personal communications services (PCS) and systems using ultra-wideband (UWB) technology. IEEE refers to the Institute of Electrical and Electronics Engineers.

In the following, different embodiments will be described using LTE as an example of an access architecture.

Figure 1:
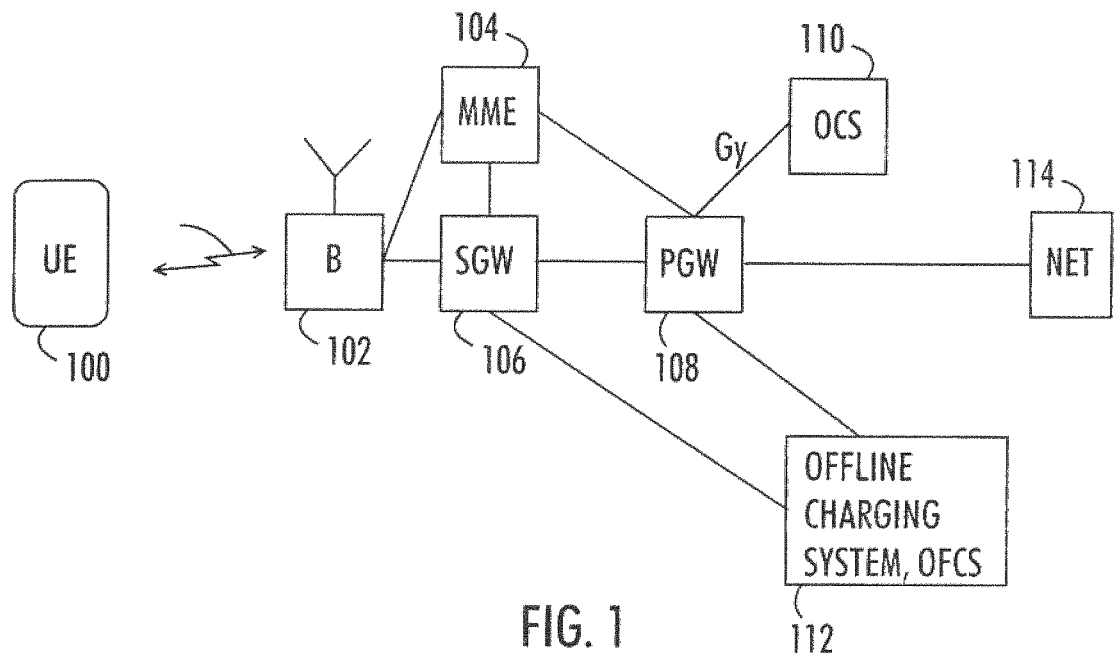
FIG. 1 illustrates an example of a communication system.

FIG. 1 is a simplified system architecture only showing some elements and functional entities, all being logical units whose implementation may differ from what is shown. It is apparent to a person skilled in the art that the system may also comprise other functions and structures that are not illustrated, for example connections to the core network/system.

The exemplary system illustrated in FIG. 1 comprises a user terminal 100 (only one illustrated in FIG. 1) and a network node 102 controlling one or more cells in a radio access system. The network further comprises a mobility management entity 104, a serving gateway 106 SGW and a Packet Data Network Gateway 108 PGW.

The MME 104 represents a mobility anchor entity in a core network that is involved in the bearer activation/deactivation processes, for example. The mobility management entity is configured to support carrier aggregation. The SGW 106 routes and forwards user data packets further. The PGW provides connectivity from the user terminal to external packet data networks by acting as the termination point of traffic for the terminal to and from outside networks or Internet 110.

The user terminal (user equipment, UE) 100 illustrates one type of an apparatus to which resources on the air interface are allocated and assigned, and thus any feature described herein with user apparatus (user equipment) may be implemented with a corresponding apparatus. The user terminal 100 refers to a portable computing device that includes wireless mobile communication devices operating with or without a subscriber identification module (SIM), including, but not limited to, the following types of devices: mobile phone, smart-phone, personal digital assistant (PDA), laptop computer, e-reading device, and tablet.

In the example of FIG. 1, the network node 102 depicts an apparatus controlling one or more cells via which access is provided to the network the user terminals and the network nodes are connected to. In an LTE-A system, such a network node is an evolved node B (eNB). The evolved node B 102, or any corresponding network apparatus controlling one or more cells, is a computing device configured to control the radio resources, and connected to the evolved packet core network, thereby providing the user terminal 100 a connection to the communication system. Typically, but not necessarily, the evolved node B comprises all radio-related functionalities of the communication whereby the evolved node B, for example, schedules transmissions by assigning certain uplink resources for the user terminal and informing the user terminal about transmission formats to be used. The node 102 may be configured to perform one or more of evolved node B functionalities.

As mentioned, in UMTS and LTE based systems there are two different kinds of mechanisms used in charging, offline charging and online charging. Online charging utilises an Online Charging System OCS 110. Offline charging utilises Charging Collection Function (CCF) and it is managed by Offline Charging System 112 OFCS. One module related to charging is Charging Data Function CDF, which may be implemented in SGW, PGW or in OCS. The mechanism used may depend on the service. Offline changing and online charging typically operate independently. Both OCS 110 and Offline Charging System 112 are connected to a Billing Domain (not shown) which is responsible for actual billing and statistics. In offline charging mechanism, charging information for traffic or using network resources is collected concurrently when resources are used. At the end of the usage, Charging Data Record CDR files are generated by the network, and transmitted to the Billing Domain. In an embodiment, CDR files are generated in Offline Charging System.

In online charging mechanism, charging information for traffic or using network resources is collected concurrently when resources are used as in offline charging. However, in online charging authorization for the use of network resources must be obtained by the network before the resources are used. The right to use the resources is granted by the Online Charging System 110. Thus, the OCS 110 can take actions like allow the resource usage traffic, deny certain traffic types, and when subscriber's credit runs out, to deny further subscriber resource usage traffic.

The online charging mechanism requires to implement an interface between the PGW 108 and the OCS 110 for reporting the subscriber's charging data. The interface defined is a protocol called "DCCA: Diameter Credit Control Application". In the DCCA protocol, following messages are defined: Credit Control Request CCR and Credit Control Answer CCA.

Credit Control Request CCR is sent from the PGW (acting as a Credit Control Client) to the OCS (acting as a Credit Control Server). There are three types of CCR messages:

"Initial" (or CCR-I, or CCR-Init) which is sent from the PGW to the OCS to create the DCCA session. This message marks the start of a credit control session (DCCA session).

"Update" (or CCR-U, or CCR-Update) which is sent from the PGW to the OCS several times during the DCCA session. It is used to request quota (such as to request X Mbytes of Skype traffic), to report the consumed quota, or to inform changes on the network, like subscriber's location changing from LTE to 3G).

"Terminate" (or CCR-T). This message is sent from the PGW to the OCS to terminate the DCCA session. It marks the end of the credit control session (DCCA session). It is usually done when the bearer related to the user terminal is terminated (eg. subscriber turns off his phone), or in case there is a network error.

Credit Control Answer CCA is sent from the OCS to the PGW. There are three types of CCA messages:

"Initial" (or CCA-I, or CCA-Init. This is the reply to the CCR-I). Sent from OCS to PGW to authorize the DCCA session to be created. Alternatively it can deny the DCCA session, which means that the bearer related to the user terminal may be terminated (for example if the OCS does not recognize the subscriber).

"Update" (or CCA-U, or CCA-Update. This is the reply to the CCR-U). Sent from OCS to PGW. It is used to grant quota (eg. 1 MB of Skype traffic) or to deny further traffic, or to command the PGW to take certain actions (for example to redirect the subscriber's traffic to an operator's webpage where the subscriber can purchase more credit).

"Terminate" (or CCA-T or CCA-Terminate. This is the reply to the CCR-T). Sent from OCS to PGW. It only acknowledges that OCS received the CCR-T. The CCA-T can include also error codes, but those error codes are in prior art ignored by the PGW because those arrive several seconds after the DCCA session was deleted from the PGW (and in many cases, also several seconds after the bearer related to the user terminal was deleted).

Another concept is MSCC (Multiple Services Credit Control), which is a container to report a specific traffic type. For example, a CCR-U may report 3 MSCCs, 1 for Skype traffic, 1 for web traffic, 1 for video traffic. CCA-U will reply with the 3 MSCCs, granting quota or denying traffic for each of those 3 traffic types. For example, it can grant 1 MByte for Skype, 500 Kbytes for web browsing, and it can deny video traffic.

Figure 2:
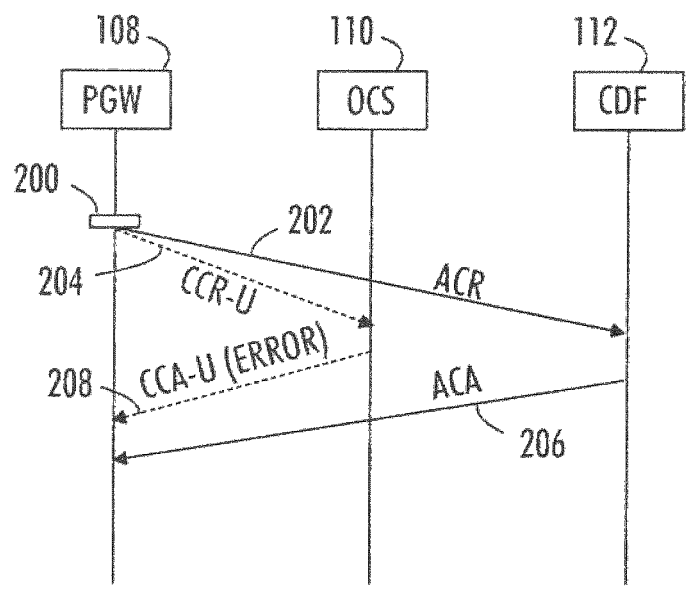
FIG. 2 illustrates some problems relating to the co-operation of online and offline charging.

There are some problems relating to the co-operation of online and offline charging. FIG. 2 illustrates an example. The example illustrates charging relates messages between different network elements related to charging, in particular to an implementation where the CDF (Charging Data Function) is implemented as an external function from the PGW. At a time instant online charging trigger 200 occurs. This may happen for example if a quota related to resource usage is exhausted. The PGW is configured to report offline charging data to CDF by sending an Accounting request ACR 202 to CDF and to report online charging data to OCS using a CCR-U message 204. The CDF is configured to generate a Charging Data Record CDR. In the example of FIG. 2, The OCS sends a reply CCA-U 208 to PGW with an error code. The CDF replies with an Accounting acknowledge ACA message 206. In this example, the CDF receives the charging data without knowledge of any possible error in the OCS. Then by inspecting the CDRs generated by the CDF, it is impossible to know if OCS had an error processing that charging data. The CDR field "Result Code" which should record any error in OCS will show value "SUCCESS" because there was no error detected at the time the ACR was sent.

Network operators usually group their subscribers in different charging groups according to their own business models. The PGW may be configured to generate offline charging data, online charging data or both, depending on the charging group the subscriber belongs to.

Some embodiments of the present invention are related to the case when the PGW generates both, online and offline charging data for a subscriber.

Figure 3:
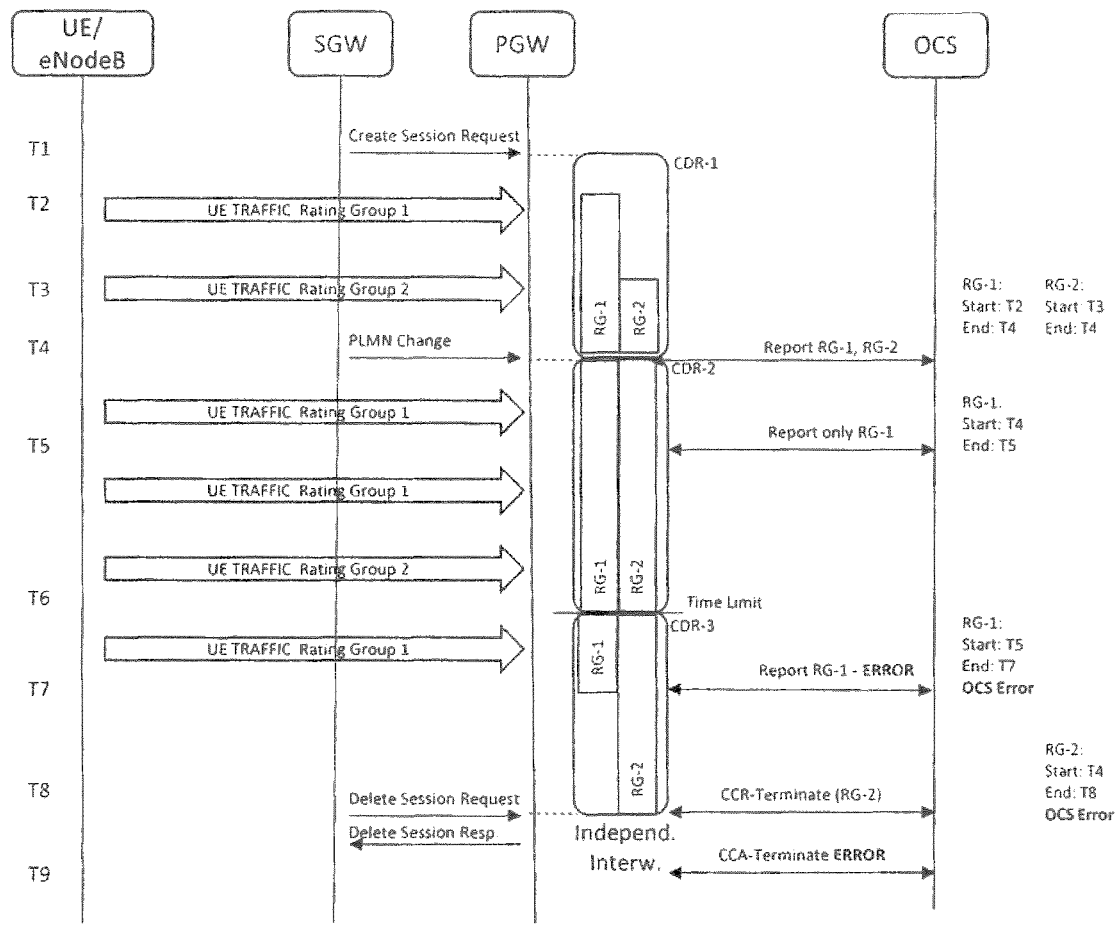
FIG. 3 illustrates some limitations observed in state-or-the-art implementation.

The diagram of FIG. 3 illustrates other limitations observed in state-or-the-art implementations which are currently experienced by network operators. And because the mandatory Independent Interworking is the only highly available implementation, the diagram highlights the problems of Independent Interworking 3GPP mechanism.

In the diagram different phases are denoted as phases T1, T2, to T9.

In phase T1, SGW transmits a Create Bearer Request 300 to PGW for user terminal communication. PGW creates the bearer. PGW sends CCR-Init to OCS which replies with CCA-Init. Thus, a DCCA session (online charging sessions) is created and a Charging Data Record CDR is opened.

In phase T2, user terminal starts generating traffic which maps to a Rating Group 1 (eg. Skype). The PGW will request quota for RG1 from the OCS. The OCS grants quota. A container is opened at the CDR for collecting charging data from RG1.

In phase T3, UE starts generating traffic which maps to Rating Group 2 (eg. Web browsing). PGW will request quota for RG2 from the OCS. The OCS grants quota and container is opened at CDR for collecting charging data from RG2.

In phase T4, a PLMN Change happens. This is a charging trigger which closes the CDRs and also reports all quota usage to the OCS. The PGW transmits a CCR-U message to the OCS for reporting RG-1 and RG-2 charging data. The OCS grants more quota to both rating groups.

Until this point, charging data in CDRs is the same than the reported to OCS. Reporting is done from until T4 for both Rating Groups.

In phase T5, the quota granted to RG-1 is consumed. The PGW is configured to transmit a CCR-U reporting the charging data for RG-1. It does not report quota for RG-2 because there is still quota available. This Online Charging Trigger does not affect CDR containers in any way.

In phase T6, an Offline Charging Trigger (Time limit) occurs. In this example, the network operator has configured to generate CDR, eg. every 60 minutes. All charging data is reported. RG-1 and RG-2 are both reported from T4 to T6. Online charging is not affected by this offline charging trigger.

In phase T7, Rating Group 1 quota expires and more quota is requested. There is an error at the OCS which is reported in a CCA message, with Result-Code AVP indicating which error occurred.

RG-1 is terminated, and traffic for RG-1 stops. Termination of a service data flow will also close the CDR container for RG-1. However the CDR remains open.

In this example (independent interworking), only the Service Data Flow Termination is the reason for closing the container (which occurred when the failed CCA arrived several seconds later).

One problem in the above scenario is that the OCS reported an error for RG-1 for the charging data reported from T5 to T7. However, the CDR Container includes charging data from T6 to T7. CDR already reported the charging data from T5 to T6 in the previous CDR which was already delivered to operator's Offline Charging System.

In phase T8, a normal request to release the bearer is received. Final CDR is closed (Normal Release). Bearer is released and the PGW is configured to transmit a CCR-Terminate to the OCS to report the charging data. It reports only RG-2, from T4 to T8 as RG-1 is not anymore active and it was already reported.

In this example case, the OCS reports with an error in a CCA-Terminate. A Result-Code AVP includes the details of the error. CCA-T is received several seconds after the bearer was deleted and the final CDR generated.

Another problem in this prior art scenario is that the OCS reported an error which is not visible in the Final CDR. The network operator cannot see by inspecting the CDR that there was any error in OCS. That information is lost.

The exact same problem may happen in both Tight Interworking and in Independent Interworking mechanisms.

Figure 4:
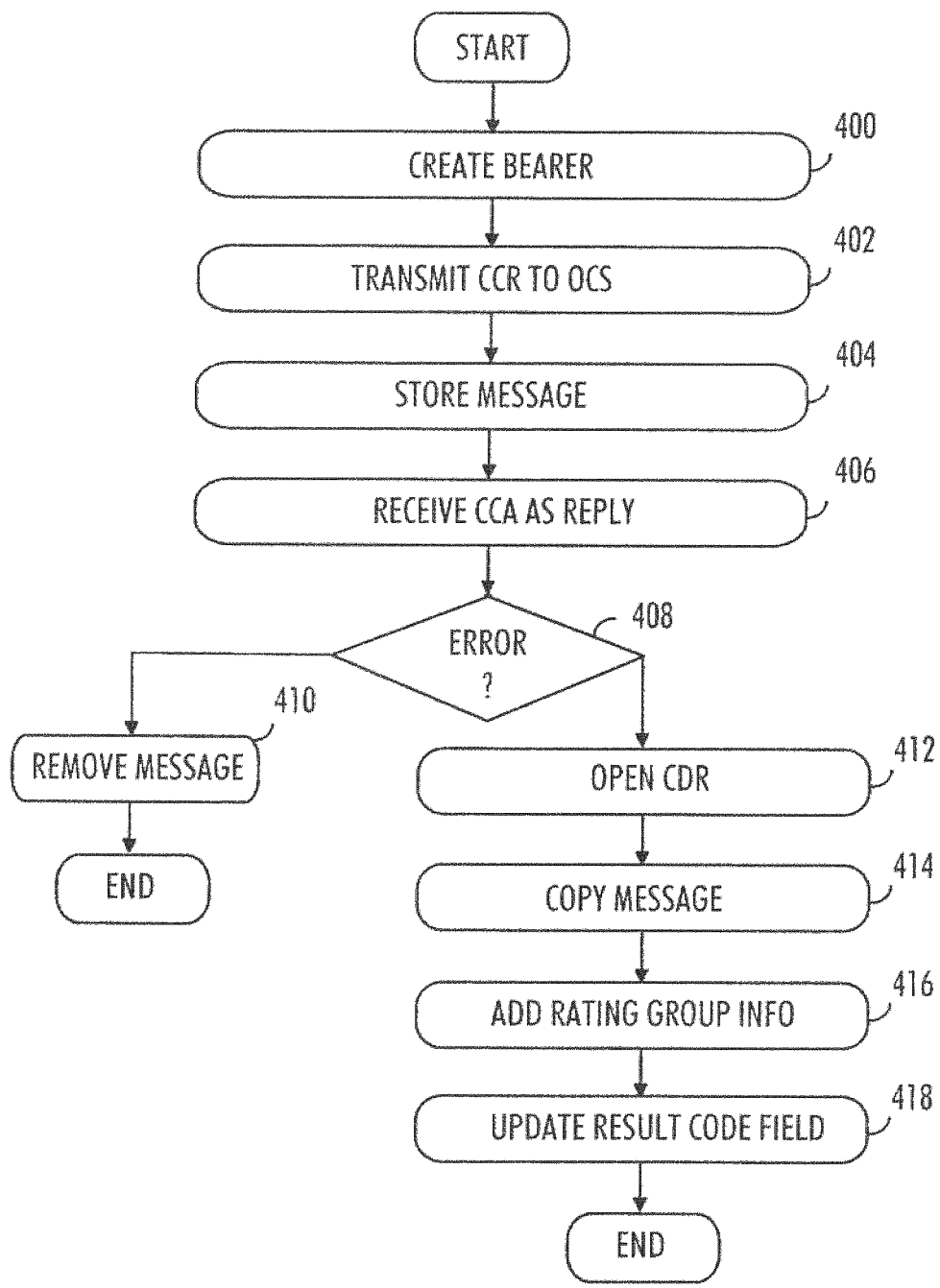
FIG. 4 is a flowchart illustrating an embodiment.

To solve the above and other problems related to generation of charging information it is proposed to generate the CDR containers only when there is an error reported by OCS. Thus, they are not generated at the same time as the bearer is created. Further, it is proposed to not follow any of the offline charging triggers, nor any of the online charging triggers for closing CDR containers, nor for closing CDRs. The CDR generation is proposed to be used only as a backup in case of errors detected in the Online Charging System FIG. 4 is a flowchart illustrating an embodiment of the invention. The figure illustrates an example of the operation of a network apparatus such as a PGW. The steps of the flowchart may also be in different order than illustrated in FIG. 4.

In step 400, the apparatus is configured to create a bearer for user terminal communication. A charging data record CDR is not opened at this phase.

In step 402, the apparatus is configured to transmit a credit control request CCR message to Online Charging System. This may happen for example if a charging trigger is due (online charging trigger, or offline charging trigger).

In step 404, the apparatus is configured to store the message to a transmission buffer.

In step 406, the apparatus is configured to receive a credit control answer CCA message as a reply to the request message. In an embodiment, if a reply has not been received in a given time limit, the apparatus may be configured to resend the credit control request message.

If the credit control answer message does not comprise 408 an error code, the stored message is removed 410 from the transmission buffer and operation ends.

Otherwise, if the message comprises an error code (either at command level or at MSCC level) the apparatus is configured in step 412 to open a charging data record CDR and timestamp the opening with the time the bearer was created. If the detected error was the first regarding the bearer, the CDR was not open and is opened at this phase. However, if there had been an earlier error the CDR was opened when processing that error and there is no need to reopen in at this phase.

In step 414, the apparatus is configured to copy the message from the transmission buffer to the charging data record;

In step 416, the apparatus is configured to add information regarding rating groups affected by the error to the charging data record as containers and closing the containers. Only information regarding those rating groups that are affected by the OCS error are added as CDR containers to the CDR. If the error code was a command level error, it affects all rating groups. If the error code was MSCC level error, it affects only a particular rating group. Thus, containers that were processed correctly by OCS are not added to the CDR.

In step 418, the apparatus is configured to update the result code-field of the charging data record according to the error code.

After the above steps, the apparatus is configured to close the added CDR containers. However the CDR is normally not closed and it remains open. However there are some conditions when the CDR can be closed.

In an embodiment, if the bearer has a Diameter Credit Control Application DCCA session and the reply is a credit control answer terminate CCA-T message, the CDR may be closed. As the CCA-T is also a CCA message, the Result-Code at CCA-T will be visible in the result code-field of the CDR as described above. However, the closing timestamp of the CDR will be set as in the 3GPP standard (the time the bearer is deleted).

In an embodiment, if the bearer does not have a DCCA session (for example due to Failure Handling Continue mechanism), the CDR is closed when the bearer is released.

In an embodiment, the CDR may be closed if the maximum number of changes in offline charging conditions triggers closing of the charging data record.

In an embodiment, when a CCA message arrives with a command level error (error which affects all Rating Groups), all Rating Groups which are not reported to the OCS will be sent directly to the CDR.

Figure 5:
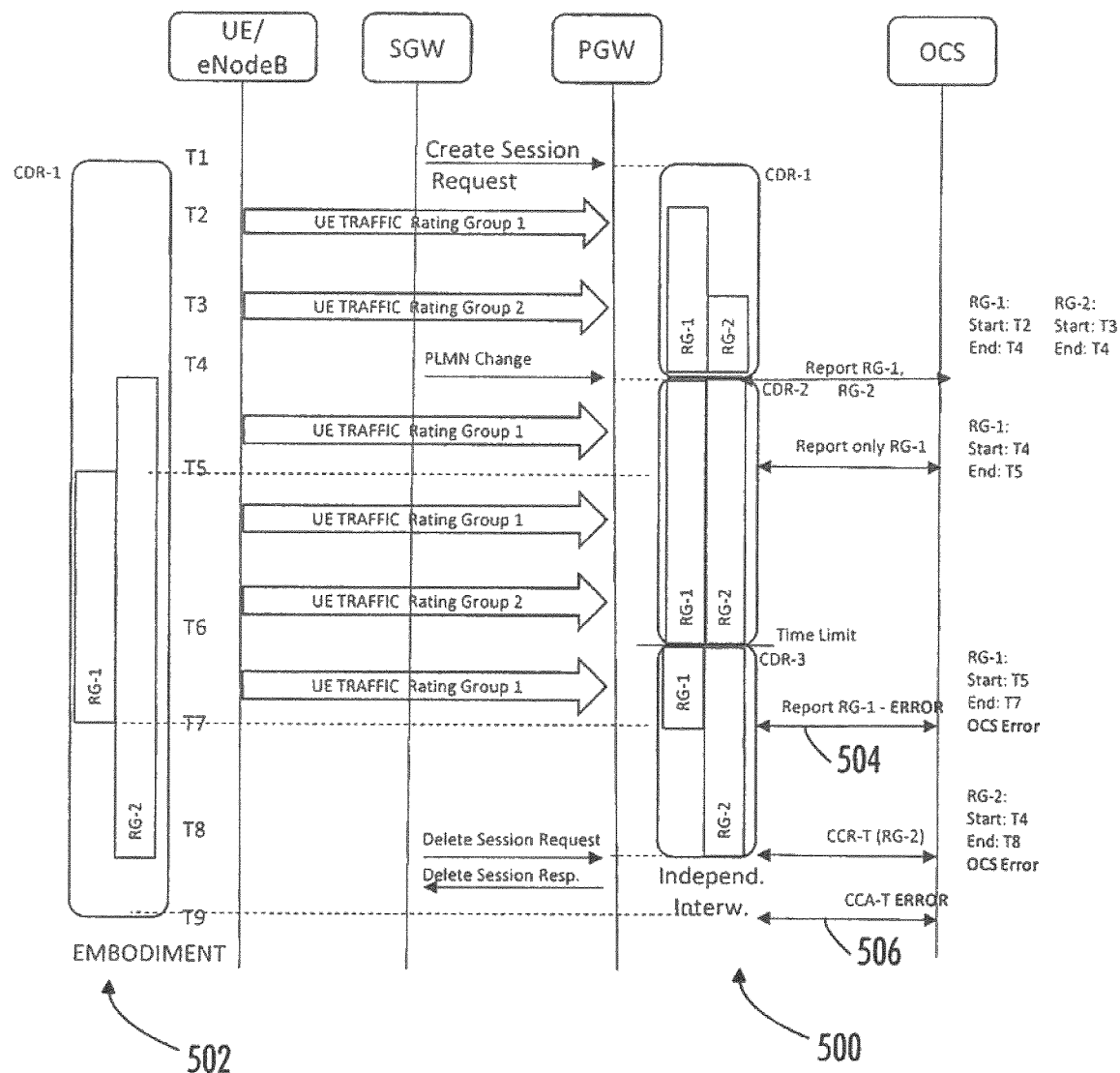
FIGS. 5, 6 and 7 are signalling charts illustrating some embodiments.

FIG. 5 illustrates an example of the same situation as FIG. 3 but now the PGW is configured to apply the above described steps. FIG. 5 shows the prior art actions of Independent Interworking 500 and an embodiment 604 of the invention on the left side of the diagram.

The CDR is created at time instant T7, when the first error is received 504 from the OCS. Further, a CDR container for RG-1 is added. The container includes the Result-Code sent by OCS for this Rating Group. It may be noted that the time stamp used in the creation of the CDR is the time of when bearer is created, although the CDR is actually created later. That is seen in FIG. 5 which shows the CDR to be present from time instant T1 although it was created in reality on time instant T7.

It may be noted that that the OCS reported the error in the reply for the RG-1 message sent by the PGW regarding T5-T7. In the prior art solution of FIG. 3, RG-1 was reported already at time instant T6. In that case the OCS error is only copied to the last RG-1 container which includes data from T6-T7, which is erroneous behaviour. In the proposed solution of FIG. 5, the error Result-Code is correctly reported in a CDR container for RG-1 from T5-T7.

The example of FIG. 5 shows another error at CCA-Terminate 506. CCA-T reported RG-2 from T4 to T8. In the prior art solution of FIG. 3, the error at CCA-T is not recorded at CDR. In that case the CDR was already closed (with Result Code CDR field SUCCESS). Thus, the network operator is unable to notice any error in OCS by inspecting the CDR. In the proposed solution of FIG. 5, the container for RG-2 comprising data from T4-T8, is closed at time instant T9 which is a perfect match to what was reported to OCS. It also includes the error Result-Code sent at CCA-T.

The generated CDR does not include CDR containers with charging data that was successfully processed by OCS. Only charging data related to errors is included.

It may be noted that that CDR is generated when an error occurs. In other words, when there are no errors there is no need to generate a CDR. Because of this the load to Offline Charging system is reduced.

Figure 6:
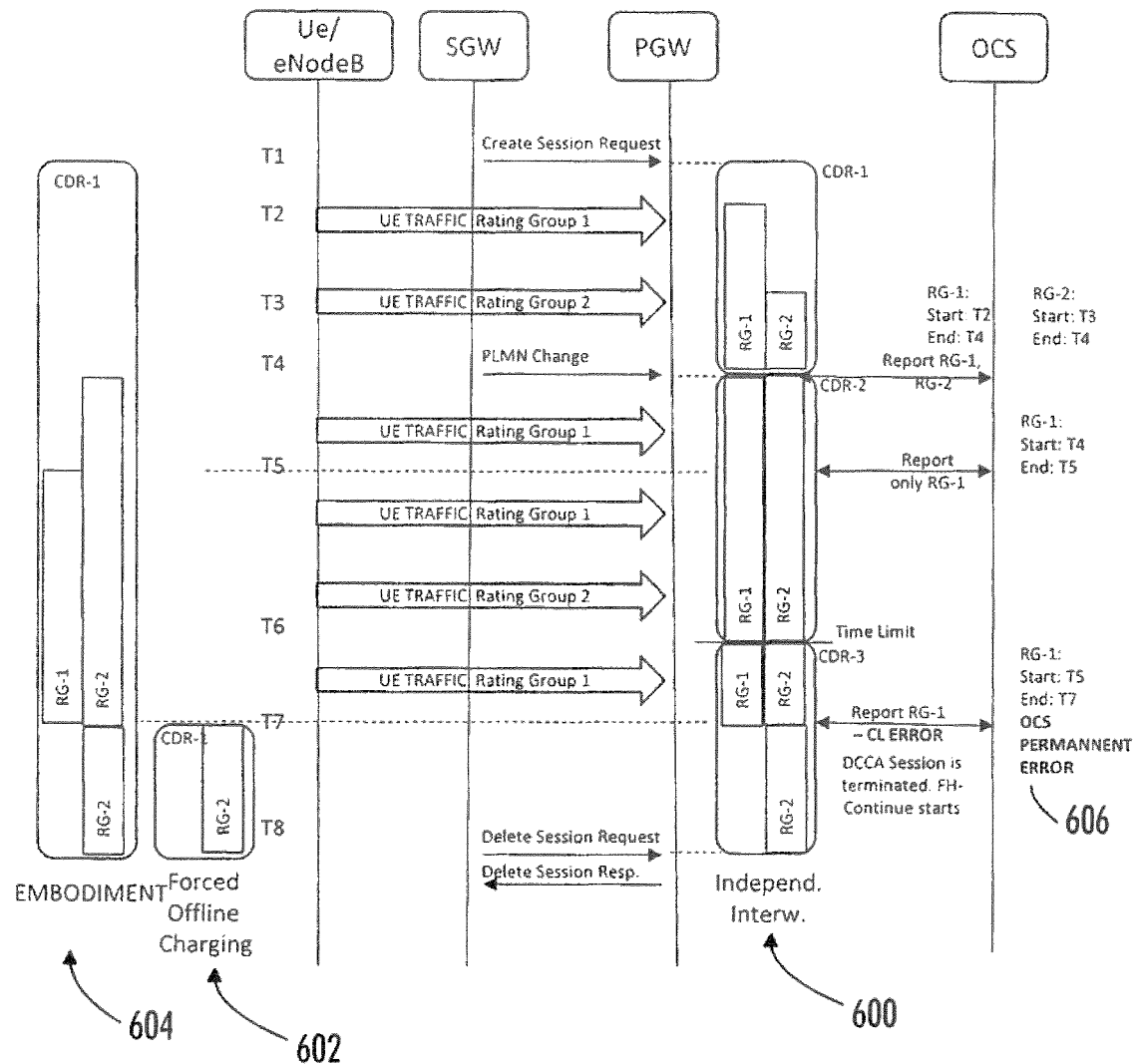

FIG. 6 illustrates another example, where the proposed solution is compared to prior art solution (Forced Offline Charging). FIG. 6 shows the prior art actions of Independent Interworking 600, Forced Offline Charging 602 and an embodiment 604 of the invention.

In the prior art solution the generation of CDRs is executed at the moment a permanent error with OCS is detected. In the example of FIG. 6, there is one error, which is a permanent error 606 at time instant T7, where the error triggers Failure Handling Continue. A DCCA session is terminated and CDRs generated.

In the illustrated example, in the prior art solution 602, the PGW will correctly report in CDRs the charging data from the moment the Failure Handling Continue starts. However the charging data (RG-1, from T5 to T7, and RG-2 from T4 to T7) which was not processed by OCS is not reported in the forced CDR. Thus, network operators lose revenue with current state-of-the-art implementation.

The CDR generated by the prior art Independent Interworking mechanism 600 defined by 3GPP. It reports the charging data accurately with one exception. The Result-Code value in CDRs does not match to CDR containers where it is reported.

In contrast, the proposed solution does not lose data. As all charging data is processed correctly.

Figure 7:
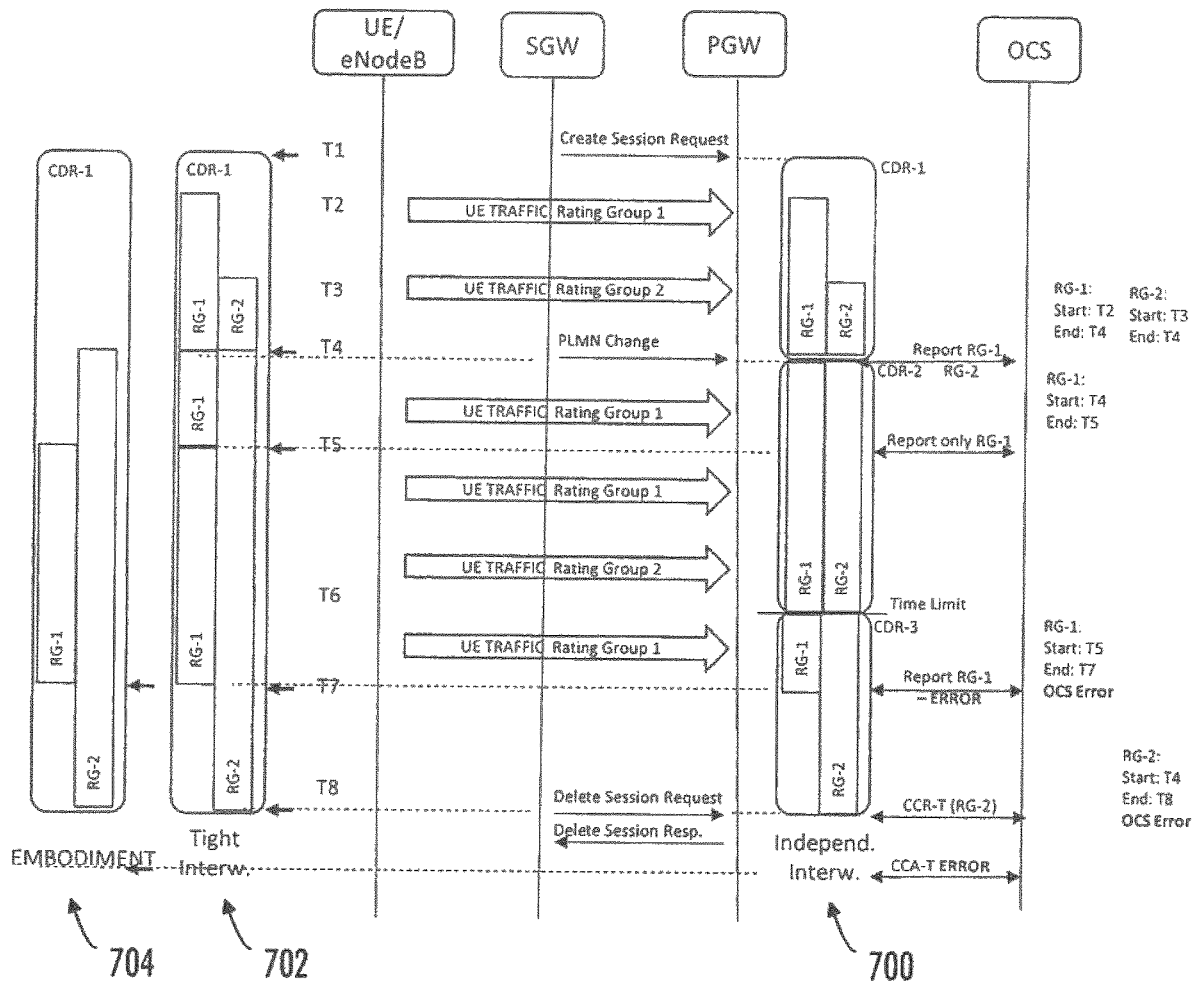

FIG. 7 illustrates another example, where the proposed solution is compared to another prior art solution (Tight Interworking). FIG. 7 illustrates the difference from embodiments of the invention and the CDR generated using Tight Interworking.

FIG. 7 shows the prior art actions of Independent Interworking 700, Tight Interworking 702 and an embodiment 704 of the invention. Some differences between prior art and the embodiment are readily seen in FIG. 7.

First, the trigger for opening the CDR is T1 in Tight Interworking, and T7 in the embodiment.

Second, when a CCR message is sent to OCS in Tight Interworking, a new container with exactly the same charging data is added to the CDR (as specified in 3GPP specifications).

In contrast, in the embodiment of the invention, when a CCR message is sent to OCS, no CDR container is added. The CDR container is added to the CDR only at the reception of a CCA message (several seconds after CCR was sent), and only if the CCA included an Error Result Code value.

Third, in Tight Interworking the trigger for closing the CDR is at time instant T8, whereas in the solution according to an embodiment the trigger is the reception of CCA-T.

Fourth, In Tight Interworking CDR reports all consumed charging data. In the solution according to an embodiment only the charging data which was encountered some problem at OCS is reported.

Fifth, the error received at CCA-T is lost in the Tight Interworking CDR (as 3GPP trigger for closing the CDR is Delete Session Request, not CCA-T), while the proposed solution has a perfect match in the error code reported at CCA-T (and at any CCA-U message).

In an embodiment, the proposed solution generates CDRs as a backup in case of error with Online charging system. In creating CDRs, a NodeID is a parameter which may be used to identify the entity which creates the Charging Data Record CDR. In an embodiment, it is proposed to use a different NodeID when creating CDRs according to the methods of the embodiments of the invention than the NodeID used for generating the CDRs used with prior art mechanisms such as Independent-Interworking mechanism. In this way, CDRs generated by the proposed mechanisms can be generated independently from the normal CDR generation by operators. Thus if needed, the PGW could generate PGW-CDRs normally (following state of the art independent interworking mechanism) using a given Node ID identifier. At the same time, CDRs could be generated with a different NodeID only when an OCS error is detected, following the proposed mechanism. The different NodeID will prevent duplicate charging, as post processing will use the NodeID to differentiate the CDRs. For example, state-of-the-art CDRs may be kept for audit, and the CDRs generated by the proposed mechanism may be used for billing.

In addition, CDRs generated by this proposed mechanism can be written to a different CDR file. CDR files include the NodeID as part of the file name.

Even in the case where an operator decides to generate both CDR files (one with CDRs from the proposed mechanism and the other for state of the art CDRs), the proposed mechanism will still reduce resources at the billing system, because the state of the art CDRs for online-offline subscribers will not be used for billing (only for audit purposes, thus those CDRs will not pass through the operator's Billing System).

The proposed mechanism is useful also when subscribers are billed by the OCS and CDRs are used only as backup in case of problems at the OCS.

Figure 8:
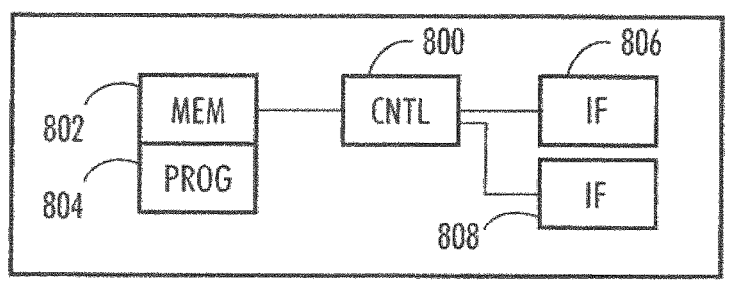
FIG. 8 illustrates an example of an apparatus of an embodiment.

FIG. 8 illustrates an embodiment. The figure illustrates a simplified example of an apparatus applying embodiments of the invention. In some embodiments, the apparatus may be a PGW of a communication system or a part of a PGW of a communication system. In some embodiments, the apparatus may be another network element of a communication system.

It should be understood that the apparatus is depicted herein as an example illustrating some embodiments. It is apparent to a person skilled in the art that the apparatus may also comprise other functions and/or structures and not all described functions and structures are required. Although the apparatus has been depicted as one entity, different modules and memory may be implemented in one or more physical or logical entities.

The apparatus may comprise a controller, controlling circuitry or processor 800. The apparatus may further comprise a memory 802 for storing data. Furthermore the memory may store software 804 executable by the circuitry 800. The memory may be integrated in the control circuitry. The memory may be used to maintain a transmission buffer.

The apparatus may further comprise one or more interfaces 806, 808 for communicating with other network elements such as SGW, eNodeB, MME, for example.

In an embodiment, the software 804 may comprise a computer program comprising program code means adapted to cause the control circuitry 800 to create a bearer for user terminal communication; transmit a credit control request message to Online Charging System; store the message to the transmission buffer, receive a credit control answer message as a reply to the request message and, if the credit control answer message comprises an error code: open a charging data record and timestamping the opening with the time the bearer was created; copy the message from the transmission buffer to the charging data record; add information regarding rating groups affected by the error to the charging data record as containers and closing the containers and update result code-field of the charging data record according to the error code.

The steps and related functions described in the above and attached figures are in no absolute chronological order, and some of the steps may be performed simultaneously or in an order differing from the given one. Other functions can also be executed between the steps or within the steps. Some of the steps can also be left out or replaced with a corresponding step.

The apparatuses or controllers able to perform the above-described steps may be implemented as an electronic digital computer, which may comprise a working memory (RAM), a central processing unit (CPU), and a system clock. The CPU may comprise a set of registers, an arithmetic logic unit, and a controller. The controller is controlled by a sequence of program instructions transferred to the CPU from the RAM. The controller may contain a number of microinstructions for basic operations. The implementation of microinstructions may vary depending on the CPU design. The program instructions may be coded by a programming language, which may be a high-level programming language, such as C, Java, etc., or a low-level programming language, such as a machine language, or an assembler. The electronic digital computer may also have an operating system, which may provide system services to a computer program written with the program instructions.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

An embodiment provides a computer program embodied on a distribution medium, comprising program instructions which, when loaded into an electronic apparatus, are configured to control the apparatus to execute the embodiments described above.

The computer program may be in source code form, object code form, or in some intermediate form, and it may be stored in some sort of carrier, which may be any entity or device capable of carrying the program. Such carriers include a record medium, computer memory, read-only memory, and a software distribution package, for example. Depending on the processing power needed, the computer program may be executed in a single electronic digital computer or it may be distributed amongst a number of computers.

The apparatus may also be implemented as one or more integrated circuits, such as application-specific integrated circuits ASIC. Other hardware embodiments are also feasible, such as a circuit built of separate logic components. A hybrid of these different implementations is also feasible. When selecting the method of implementation, a person skilled in the art will consider the requirements set for the size and power consumption of the apparatus, the necessary processing capacity, production costs, and production volumes, for example.

An embodiment provides an apparatus comprising means for creating a bearer for user terminal communication; means for transmitting a credit control request message to Online Charging System; means for storing the message to a transmission buffer; means for receiving a credit control answer message as a reply to the request message and, means for opening a charging data record and timestamping the opening with the time the bearer was created if the credit control answer message comprises an error code; means for copying the message from the transmission buffer to the charging data record; means for adding information regarding rating groups affected by the error to the charging data record as containers and closing the containers; means for updating result code-field of the charging data record according to the error code.

It will be obvious to a person skilled in the art that, as the technology advances, the inventive concept can be implemented in various ways. The invention and its embodiments are not limited to the examples described above but may vary within the scope of the claims.

The invention claimed is:

1. An apparatus in a communication system, comprising:
   at least one processor and at least one memory including a computer program code, wherein the at least one memory and the computer program code are configured, with the at least one processor, to cause the apparatus to perform operations comprising:
   creating a hearer for user terminal communication;
   transmitting a credit control request message to an Online Charging System;
   storing the credit control request message to a transmission buffer;
   receiving a credit control answer message as a reply to the credit control request message;
   determining the credit control answer message comprises an error code;
   opening a charging data record and timestamping, the opening with the time the hearer was created in response to the credit control answer message comprising the error code;
   copying the credit control request message from the transmission buffer to the charging data record;
   adding information regarding rating groups affected by the error code to the charging data record as containers and closing the containers; and
   updating a result code-field of the charging data record according to the error code.

2. The apparatus of claim 1, the at least one memory and the computer program code configured to, with the at least one processor, cause the apparatus further to: transmitting the credit control request message to the Online Charging System when an online charging trigger is due.

3. The apparatus of claim 1, the at least one memory and the computer program code configured to, with the at least one processor, cause the apparatus further to: leaving the charging data. record open after the updating the result code-field, unless the bearer has a Diameter Credit Control Application session and the reply is a credit control answer terminate message.

4. The apparatus of claim 1, the at least one memory and the computer program code configured to, with the at least one processor, cause the apparatus further to: leaving the charging data record open after the updating the result code-field, unless the hearer does not have a Diameter Credit Control Application session and the bearer is closed.

5. The apparatus of claim 1, the at least one memory and the computer program code configured to, with the at least one processor, cause the apparatus further to: leaving the charging data record open after the updating the result code-field, unless maximum number of changes in offline charging conditions triggers closing of the charging data record.

6. The apparatus of claim 1, the at least one memory and the computer program code configured to, with the at least one processor, cause the apparatus further to: after receiving the reply with the error code determining that this was not a first error code related to the hearer and that the charging data record is already opened.

7. The apparatus of claim 1, the at least one memory and the computer program code configured to, with the at least one processor, cause the apparatus further to: removing the stored credit control request message from the transmission buffer if the reply to the credit control request message does not comprise the error code.

8. The apparatus of claim 1, the at least one memory and the computer program code configured to, with the at least one processor, cause the apparatus further to: if the reply has not been received in a given time limit, resend the credit control request message.

9. The apparatus of claim 1, the at least one memory and the computer program code configured to, with the at least one processor, cause the apparatus further to: use a given NodeID when creating the charging data record, when the credit control answer message comprises the error code, and another NodeID when creating other charging data records.

10. A method in an apparatus of a communication system, comprising;
    creating a bearer for user terminal communication;
    transmitting a credit control request message to an Online Charging System;
    storing the credit control request message to a transmission buffer;
    receiving a credit control answer message as a reply to the credit control request message;
    determining the credit control answer message comprises an error code;

opening a charging data record and timestamping the opening with the time the bearer was created in response to the credit control answer message comprising the error code;
copying the credit control request message from the transmission buffer to the charging data record;
adding information regarding rating groups affected by the error code to the charging data record as containers and closing the containers: and
updating a result code-field of the charging data record according to the error code.

11. The method of claim 10, further comprising: transmitting a credit control request message to the Online Charging System when an online charging trigger is due.

12. The method of claim 10, further comprising: leaving the charging data record open after the updating the result code-field, unless the hearer has a Diameter Credit Control Application session and the reply is a credit control answer terminate message.

13. The method of claim 10, further comprising: leaving the charging data record open after the updating the result code-field, unless the bearer does not have a Diameter Credit Control Application session and the hearer is closed.

14. The method of claim 10, further comprising: leaving the charging data record open after the updating the result code-field, unless maximum number of changes in offline charging conditions triggers closing of the charging data record.

15. The method of claim 10, further comprising: determining, after receiving the reply with the error code, that this was not a first error code related to the hearer and that the charging data record is already opened.

16. The method of claim 10, further comprising: removing the stored credit control request message from the transmission buffer if the reply to the credit control request message does not comprise the error code.

17. The method of claim 10, further comprising: resending the credit control request message, if the reply has not been received in a given time limit.

18. The method of claim 10, further comprising: using a given Nodel D when creating the charging data record, when the credit control answer message comprises the error code, and another NodelD when creating other charging data records.

* * * * *